(12) United States Patent
Gebauer et al.

(10) Patent No.: US 10,802,034 B2
(45) Date of Patent: Oct. 13, 2020

(54) METHODS AND APPARATUS PROVIDING REDUCED CARRYOVER DURING PIPETTING OPERATIONS

(71) Applicant: Siemens Healthcare Diagnostics Inc., Tarrytown, NY (US)

(72) Inventors: Carl Gebauer, Granite Springs, NY (US); Moses Peter, Bridgeport, CT (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 456 days.

(21) Appl. No.: 15/549,992

(22) PCT Filed: Feb. 9, 2016

(86) PCT No.: PCT/US2016/017162
§ 371 (c)(1),
(2) Date: Aug. 9, 2017

(87) PCT Pub. No.: WO2016/130553
PCT Pub. Date: Aug. 18, 2016

(65) Prior Publication Data
US 2018/0238922 A1    Aug. 23, 2018

Related U.S. Application Data

(60) Provisional application No. 62/115,933, filed on Feb. 13, 2015.

(51) Int. Cl.
*G01N 35/10* (2006.01)
*B01L 3/02* (2006.01)
(Continued)

(52) U.S. Cl.
CPC ......... *G01N 35/1004* (2013.01); *B01L 3/021* (2013.01); *B01L 13/02* (2019.08);
(Continued)

(58) Field of Classification Search
CPC ....... G01N 35/1004; G01N 2035/1006; G01N 2035/00277; B01L 3/021; B01L 2400/0487; B08B 3/00; B08B 3/04; B08B 3/08

See application file for complete search history.

(56) References Cited

U.S. PATENT DOCUMENTS 4,517,302 A    5/1985 Saros
5,101,673 A *  4/1992 Uffenheimer ...... G01N 35/1004
                                               73/864.22
(Continued)

FOREIGN PATENT DOCUMENTS

CA    2471686 C    12/2004
EP    1 489 303 A2  12/2004
(Continued)

OTHER PUBLICATIONS

PCT International Search Report and Written Opinion dated Apr. 21, 2016 (8 Pages).
(Continued)

*Primary Examiner* — Robert R Raevis

(57) ABSTRACT

Methods and apparatus configured and adapted to provide less carryover in an automated clinical analyzer are disclosed. The methods include aspirating a scavenger segment (e.g., a buffer- and surfactant-containing segment) into the interior of a pipette along with the specimen or reagent. The scavenger film aids in preventing adherence of the specimen or reagent to the interior of the pipette. Apparatus configured to carry out the methods are provided, as are other aspects.

24 Claims, 6 Drawing Sheets

(51) Int. Cl.
*B08B 3/00* (2006.01)
*G01N 35/00* (2006.01)

(52) U.S. Cl.
CPC ......... *B08B 3/00* (2013.01); *B01L 2400/0487* (2013.01); *G01N 2035/00277* (2013.01)

(56) References Cited

U.S. PATENT DOCUMENTS

| | | | |
|---|---|---|---|
| 5,133,218 A | | 7/1992 | Uffenhiemer et al. |
| 5,264,373 A | * | 11/1993 | Wang ................... C07D 311/80 436/537 |
| 5,268,147 A | | 12/1993 | Zabetakis et al. |
| 6,114,292 A | | 9/2000 | Hoshiko et al. |
| 6,641,993 B1 | | 11/2003 | Jacobs et al. |
| 2003/0018177 A1 | * | 1/2003 | Haddad ............... C12N 15/1006 536/23.1 |
| 2003/0213905 A1 | | 11/2003 | Lennon et al. |
| 2007/0295113 A1 | | 12/2007 | Londo et al. |
| 2008/0184822 A1 | | 8/2008 | Lisec |
| 2014/0011290 A1 | | 1/2014 | Gagnaux et al. |
| 2014/0193801 A1 | * | 7/2014 | Tan ....................... C12Q 1/527 435/4 |

FOREIGN PATENT DOCUMENTS

| | | |
|---|---|---|
| GB | 2 104 656 A | 3/1983 |
| WO | 2013/169722 A1 | 11/2013 |

OTHER PUBLICATIONS (SIGMA) Triton X-1000 Productinformation Sheet [online]. 1999. [retrieved on Mar. 24, 2016]. Retrieved from the internet <URL: https://web.archive.org/web/20140821224850/http://www.sigmaaldrich.com/content/dam/sigmaaldrich/docs/Sigma/Product_Information_Sheet/1/t8532pis.pdf>; p. 1, paragraphs 5, 7.
Extended EP Search Report dated Jan. 25, 2018 of corresponding European Application No. 16749715.5, 5 Pages.

* cited by examiner

METHODS AND APPARATUS PROVIDING REDUCED CARRYOVER DURING PIPETTING OPERATIONS

FIELD

The present invention relates generally to methods and apparatus configured to reduce material carryover during pipetting operations.

BACKGROUND

Handling of liquid samples, reagents, and possibly other process fluids is important for the implementation of automated clinical chemistry test methods. Conventionally, liquid specimens, liquid reagents, and possibly other process fluids (e.g., purified water) are aspirated and/or dispensed within an automated clinical analyzer by using a pipette (otherwise referred to as a "probe"). For example, in some automated clinical analyzers, a portion of a specimen contained in a sample container (such as a test tube or the like) may be aspirated and then transferred into a reaction vessel (e.g., a cuvette) in order to determine a presence of a particular analyte contained therein. As part of this clinical chemistry test method, one or more liquid reagents may be precisely metered into the reaction vessel along with the specimen portion. In some instances, a dilutant (e.g., purified water) may be added.

A conventional configuration used for aspirating and dispensing includes a pipette having a relatively small outer diameter. The pipette may be coupled to a section of tubing that is, in turn, coupled to one or more pumps (e.g., a piston pump and/or a peristalsis pump). The aspirating and dispensing apparatus, including the pipette and the one or more pumps, is typically primed with purified water referred to as "liquid backing." The liquid backing acts as the vehicle enabling the aspirating and dispensing of the various liquids. However, handling of such specimens, liquid reagents, and dilutant may suffer from carryover problems, where residue from one aspirate and dispense sequence may be carried forward to a next aspirate and dispense sequence. Carryover may possibly affect test results, and is generally unwanted.

Some prior art aspiration systems include multiple pipettes, such as one or more for aspirating specimen and one or more other pipettes for aspirating reagent. Although this can help mitigate carryover concerns, the use of multiple pipettes adds to system cost and complexity. Furthermore, additional robots may be needed. Specimen carryover has been addressed in some instances by using a disposable tip on the pipette, which may be disposed of after a single specimen dispense. Although this method may also mitigate specimen carryover, it adds the cost of the disposable tip, adds extra process time to install and dispose of the tip, and causes additional down time to replenish the supply of tips.

Accordingly, methods and apparatus that may mitigate component carryover are desired.

SUMMARY

According to a first aspect, an improved method of reducing carryover in a pipetting operation is provided. The method includes aspirating a scavenger segment into the pipette, and aspirating a specimen or reagent into the pipette below the scavenger segment. Scavenger element may include a buffer and a non-ionic surfactant.

In another method aspect, a method of reducing carryover in an automated clinical analyzer is provided. The method includes providing a pipette including a liquid backing, aspirating a first air segment into the pipette below the liquid backing, aspirating a scavenger segment into the pipette below the first air segment, aspirating a second air segment into the pipette below the scavenger segment, aspirating a specimen or reagent into the pipette below the second air segment, and dispensing the specimen or reagent into a reaction vessel, but not the scavenger segment.

In an apparatus aspect, a pipette is provided. The pipette includes a pipette interior including a specimen or reagent, and a scavenger segment. Scavenger element may include a buffer and a non-ionic surfactant.

In another apparatus aspect, an aspirating and dispensing apparatus is provided. The aspirating and dispensing apparatus includes a robot, a pipette moveable by the robot, the pipette including a liquid backing, a pump fluidly coupled to the liquid backing, a controller configured to generate control signals to move the robot and actuate the pump to effectuate: aspiration of a scavenger segment into the pipette below the liquid backing, aspiration of a specimen or reagent into the pipette below the scavenger segment, and dispensing the specimen or reagent into a reaction vessel, but not the scavenger segment.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention is to cover all modifications, equivalents, and alternatives falling within the scope of the invention.

DESCRIPTION

For at least the above-described reasons, it is desirable to provide improved methods of aspirating and dispensing liquids in automated testing apparatus (e.g., clinical analyzers or the like) in order to mitigate carryover. In particular, it is desirable to mitigate specimen carryover and/or reagent carryover. It has been discovered by the inventor herein that the introduction of a volume of a scavenger segment into the pipette above the aspirated specimen (or aspirated reagent) may provide improved cleaning (e.g., scavenging) of the pipette. In particular, there may be fewer propensities for residue to adhere to the interior of the pipette. In some embodiments, the scavenger element may be provided between the liquid backing and the aspirated specimen (or aspirated reagent). However, it should be apparent that the present invention will work equally well for systems without liquid backing. Scavenger element may comprise a buffer (e.g., a phosphate-buffered saline), and may comprise a surfactant (e.g., a non-ionic surfactant). Improved cleaning may mitigate specimen (or reagent) carryover that might possibly affect the accuracy of subsequent testing.

These and other aspects and features of embodiments of the invention will be described with reference to FIGS. 1-12 herein.

Figure 1:
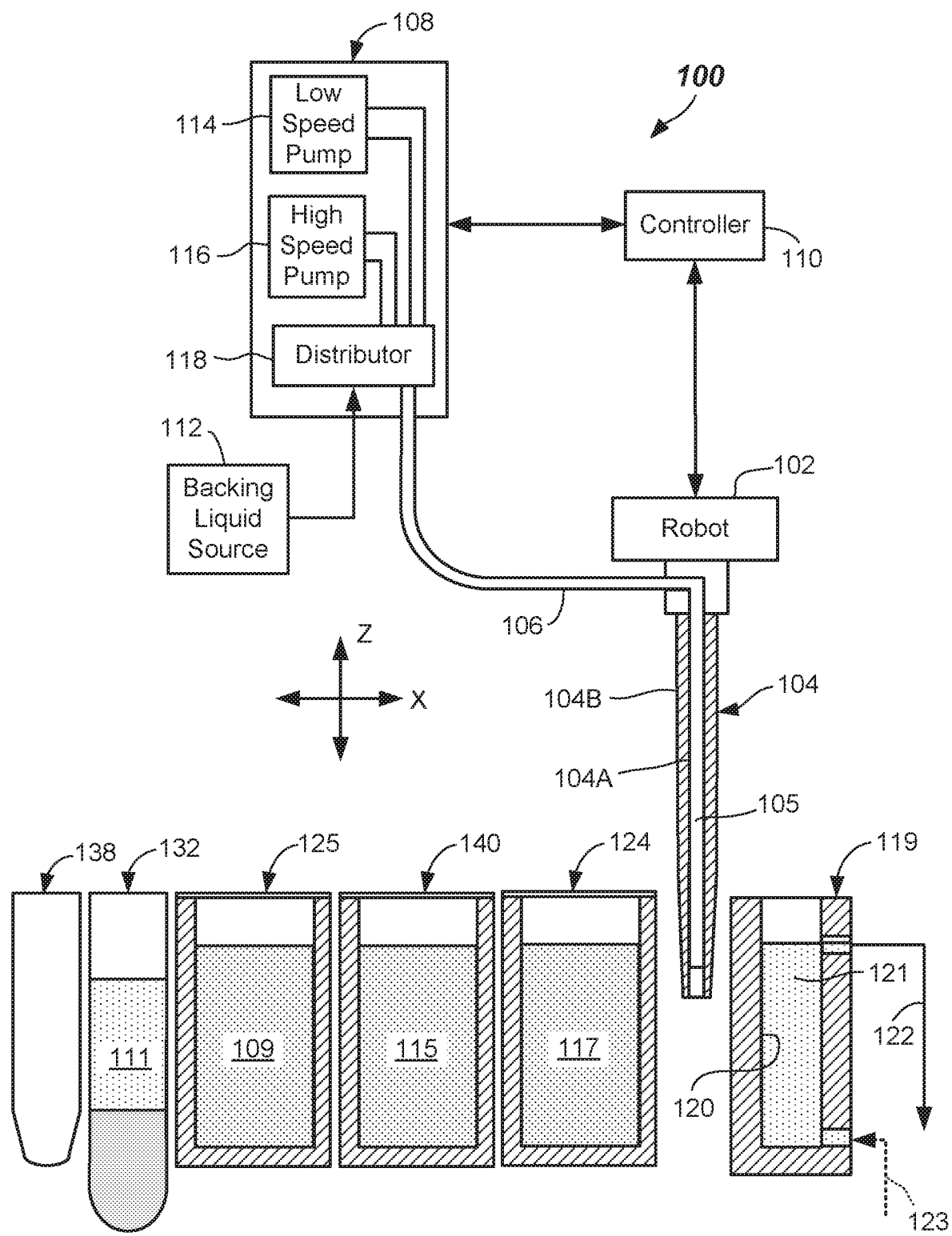
FIG. 1 illustrates a partially cross-sectioned side view of an aspirating and dispensing apparatus adapted to carry out methods according to embodiments.

As represented in FIG. 1, a configuration of an aspirating and dispensing apparatus 100 is shown. The aspirating and dispensing apparatus 100 includes a robot 102 having a pipette 104 coupled thereto. The pipette 104 may be a slender conventional pipette having an interior 104A and exterior 1046. The pipette 104 may be made from stainless steel metal. The pipette 104, however, is not limited to such material, and may be constructed from aluminum or any other metal, plastic, composite material, or combination of materials. The pipette 104 may include a length of about 75 mm, and an inner diameter between about 0.5 mm and about 1.4 mm, for example. Other sizes may be used.

The robot 102 may be any suitable robot adapted to move the pipette 104 to and from defined access locations. For example, the robot 102 may move the pipette 104 in Z directions only, X and Z directions, Y and Z direction (Y (not shown) being into and out of the paper), X, Y and Z directions, or even R and theta directions. Robot 102 may be a Cartesian or gantry type robot, a cylindrical robot (having R-theta and Z capability), a spherical robot, selective compliance assembly robot arm (SCARA) robot, other multi-linkage robot, or the like.

A section of tubing 106, which may be flexible tubing, may be fluidly coupled to the interior 104A and the tubing 106 may be, in turn, fluidly coupled to an aspirator/dispenser unit 108. The tubing 106 may be made from a polymer, such as polytetrafluoroethylene (PTFE) or other hydrophobic perfluoro-polymer, and may have an internal diameter of about 0.5 mm to about 1.5 mm, for example. Other sizes and materials may be used.

The robot 102 and aspirator/dispenser unit 108 may be operated by control signals from a controller 110 to aspirate and/or dispense fluids to and from the pipette 104. For example, at various times, the robot 102 and aspirator/dispenser unit 108 may be used to aspirate or dispense a liquid backing 105 (e.g., de-ionized purified water) contained in the tubing 106 and interior 104A, a scavenger liquid 109, a specimen 111, a cleaning solution 115, or one or more reagents 117. One or more reagents 117 may be aspirated and dispensed by the pipette 104 in some embodiments after undergoing a pipette cleaning process, which will be described herein. Optionally, the one or more reagents 117 may be aspirated and dispensed by a separate pipette and possibly a separate aspirator/dispenser unit. However, it should be recognized that the introduction of the scavenger segment in the pipette 104 may have benefits for reducing either specimen carryover, reagent carryover, or both.

In more detail, the aspirator/dispenser unit 108 may include any configuration adapted to aspirate and dispense fluids (liquids and gases (e.g., air)). The aspirator/dispenser unit 108 may include one or more pumps, distributors, passages, valves, filters, sensors, or other fluid-conveying components. For example, the aspirating/dispensing unit 108 may include two pumps as shown in FIG. 1, such as the low speed pump 114 and a high speed pump 116. The high speed pump 116 may be coupled to a liquid backing source 112 by a distributor 118 such that a liquid backing 105 from the liquid backing source 112 (e.g., a container or reservoir of de-ionized purified water) may be provided in the tubing 106 and pipette 104, such as when flushing or when a relatively large volume of liquid backing 105 is to be dispensed (e.g., during probe cleaning). The liquid backing 105 may in some instances be used as a vehicle to enable aspirating and dispensing of various liquids, such as the scavenger liquid 109, specimen 111, cleaning solution 115, and/or one or more reagents 117 from the interior 104A. The liquid backing 105 may also be used as a vehicle to enable aspiration of a gas (e.g., air) to provide air separator segments. Air separator segments may separate various liquid segments in the pipette 104 or act as transport air gaps to prevent liquids from dripping from the pipette 104 during transport.

In some embodiments, the configuration of the aspirating and dispensing apparatus 100 includes a wash station 119. The wash station 119 may include a reservoir 120 configured to receive the pipette 104. Wash station 119 may include a wash liquid 121 in the reservoir 120. In some embodiments, the wash liquid 121 may include liquid backing 105 dispensed into the reservoir 120. Overflow may exit from the reservoir 120 through outflow 122. Outflow 122 may be any suitable exit, conduit, or drain. Outflow 122 may be vacuum assisted in some embodiments. In some embodiments, the wash liquid 121 may be optionally introduced from an inflow 123. Inflow 123 may include any entrance, conduit or passage configured to introduce wash liquid 121 into the reservoir 120. Wash liquid 121 may be a detergent solution, or simply water (e.g., deionized water). In some embodiments, the wash liquid 121 may, at times during the cleaning process, be a combination of a detergent solution from the inflow 123 and liquid backing 105 from the pipette 104.

Figure 2:
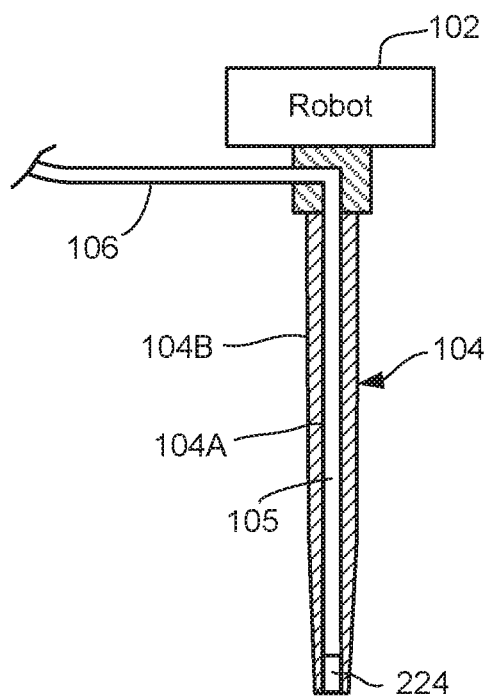
FIG. 2 illustrates a cross-sectioned side view of a pipette of the aspiration and dispensing apparatus including liquid backing and configured in a pre-aspiration condition with a first air separator according to embodiments.

Further aspects and features of embodiments of the method and apparatus will now be described with reference to FIGS. 1-12. In the depicted FIGS. 2-11, only the robot, 102, pipette 104, and part of the tubing 106 are shown. The rest of the aspirating and dispensing apparatus 100 is the same as shown in FIG. 1. FIG. 2 illustrates the condition of the pipette 104 in a pre-aspiration condition wherein the pipette 104 includes liquid backing 105 along its length, except for a first air separator 224 that has been aspirated into the end of the pipette 104. First air separator 224 may be greater than about 10 µL in air volume, and between about 10 µL and about 50 µL in some embodiments, and may initially act as a transport air gap. Other suitable air separator volumes may be used.

Figure 3:
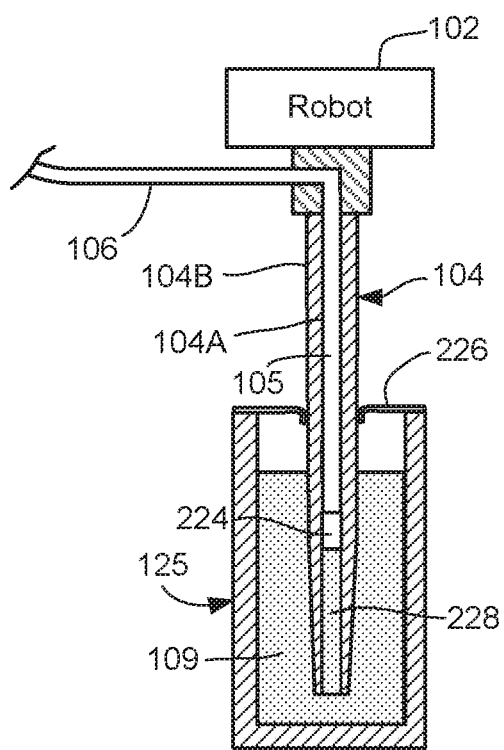
FIG. 3 illustrates a cross-sectioned side view of a pipette of the aspirating and dispensing apparatus shown piercing a scavenger pack and aspirating a scavenger segment below a liquid backing according to embodiments.

Next, as shown in FIG. 3, the pipette 104 is moved and inserted into the scavenger pack 125, which is a container that may be disposable and which contains the scavenger liquid 109. Scavenger pack 125 may contain about 50 mL of the scavenger liquid 109 or more. Scavenger liquid 109 may include any suitable liquid that functions to maintain the solubility of the potential carryover species and help release it if adhered to interior 104A of the pipette 104. In some embodiments, the scavenger liquid 109 may include a buffer, such as phosphate-buffered saline. The buffer may be a buffer solution that is a water-based salt solution containing sodium phosphate, sodium chloride and, in some formulations, potassium chloride and potassium phosphate. The osmolarity and pH of the buffer solution may match those of the human body (e.g., isotonic), which favors maintenance of blood component compatibility. The phosphate-buffered saline may have a pH of about 7.4, for example, the normal pH for human serum. The scavenger liquid 109 may have a pH of between about 6.5 pH and about 8.5 pH, for example.

Scavenger liquid 109 may also include a surfactant. Surfactant may be a non-ionic surfactant in some embodiments. The composition of the scavenger liquid 109 may comprise surfactant provided in an amount of between about 0.01% and about 0.2% by volume, and about 0.1% non-ionic surfactant in some embodiments. It is best if the components of the scavenger liquid 109 may be easily rinsed from the pipette 104 with deionized water, and do not cause harm to the test if they should carryover in small amounts. Harm to the test would include influence on the test result to make it statistically different from a test without carryover. The surfactant may be polysorbate 20, a polysorbate surfactant, which is an effective surfactant for use in the scavenger liquid 109, is easily rinsed from the pipette 104, and relatively benign towards many clinical assay formulations if carried over in small amounts. The surfactant may be used as a detergent or a detergent and emulsifier. Polysorbate 20 is a polyoxyethylene derivative of sorbitan monolaurate, and is distinguished from the other members in the polysorbate range by the length of the polyoxyethylene chain and the fatty acid ester moiety.

Pipette 104 may pierce a film cover 226 and then be immersed to a predetermined depth as shown. Film cover 226 may be removed in some embodiments. The depth may be very near the bottom of the scavenger pack 125. Other depths may be used. The aspirator/dispenser unit 108 now aspirates scavenger liquid 109 from the scavenger pack 125 into the interior 104A of the pipette 104 to form a scavenger segment 228 below the liquid backing 105 in the interior 104A of the pipette 104. Scavenger segment 228 may also be below the first air separator 224. The volume of the scavenger segment 228 that is aspirated into the interior 104A of the pipette 104 by the aspirator/dispenser unit 108 may be between about 20 µL and about 200 µL, between about 30 µL and about 100 µL, and even about 50 µL in some embodiments, for example. Other volumes of the scavenger segment 228 may be used.

Figure 4:
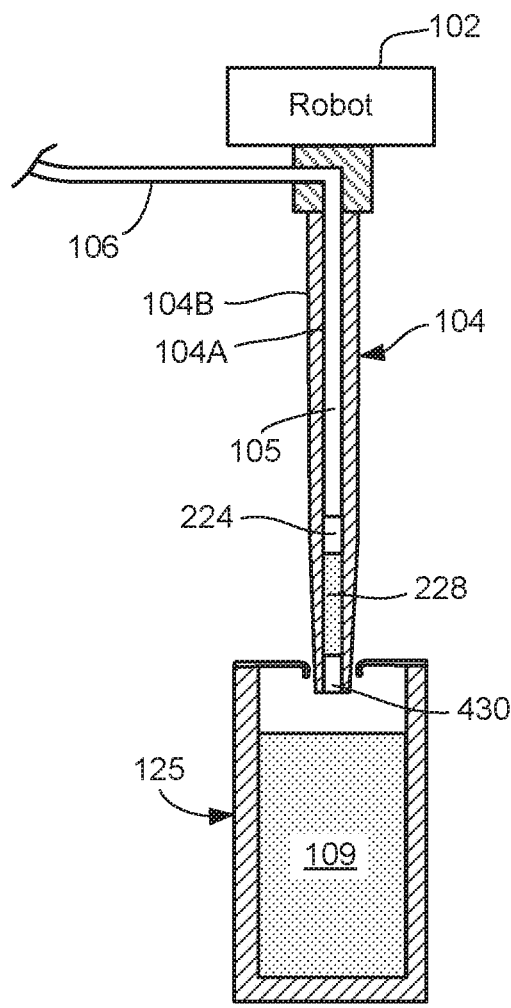
FIG. 4 illustrates a cross-sectioned side view of a pipette of the aspirating and dispensing apparatus showing aspiration of a second air separator below the scavenger segment according to embodiments.
Figure 5:
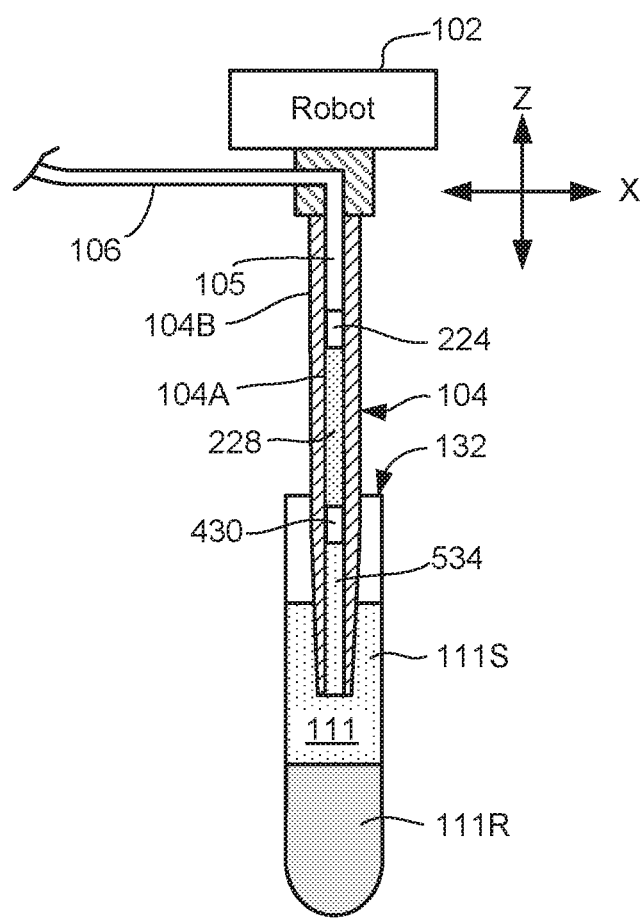
FIG. 5 illustrates a cross-sectioned side view of a pipette of the aspirating and dispensing apparatus shown aspirating a specimen below the scavenger segment according to embodiments.

As shown in FIG. 4, once the scavenger segment 228 has been aspirated, the pipette 104 is ascended and a second air separator 430 may be aspirated into the interior 104A of the pipette 104 by action of the aspirator/dispenser unit 108. The volume of the second air separator 430 may be greater than about 5 µL, or even between about 5 µL and about 50 µL in some embodiments, for example. Other volumes may be used. The pipette 104 with contained liquid backing 105 and scavenger segment 228 is then moved and immersed into the specimen container 132 containing specimen 111, as is shown in FIG. 5. If the specimen container 132 contains serum portion 111S and red blood cell portion 111R, then the pipette 104 is immersed only into the serum portion 111S, and a volume of the specimen 111 for the test to be conducted is aspirated into the interior 104A of the pipette 104 to form a specimen segment 534. At this point, the pipette 104 contains liquid backing 105, the scavenger segment 228, and the specimen segment 534, and may contain first air separator 224 and second air separator 430.

Figures 6, 7:
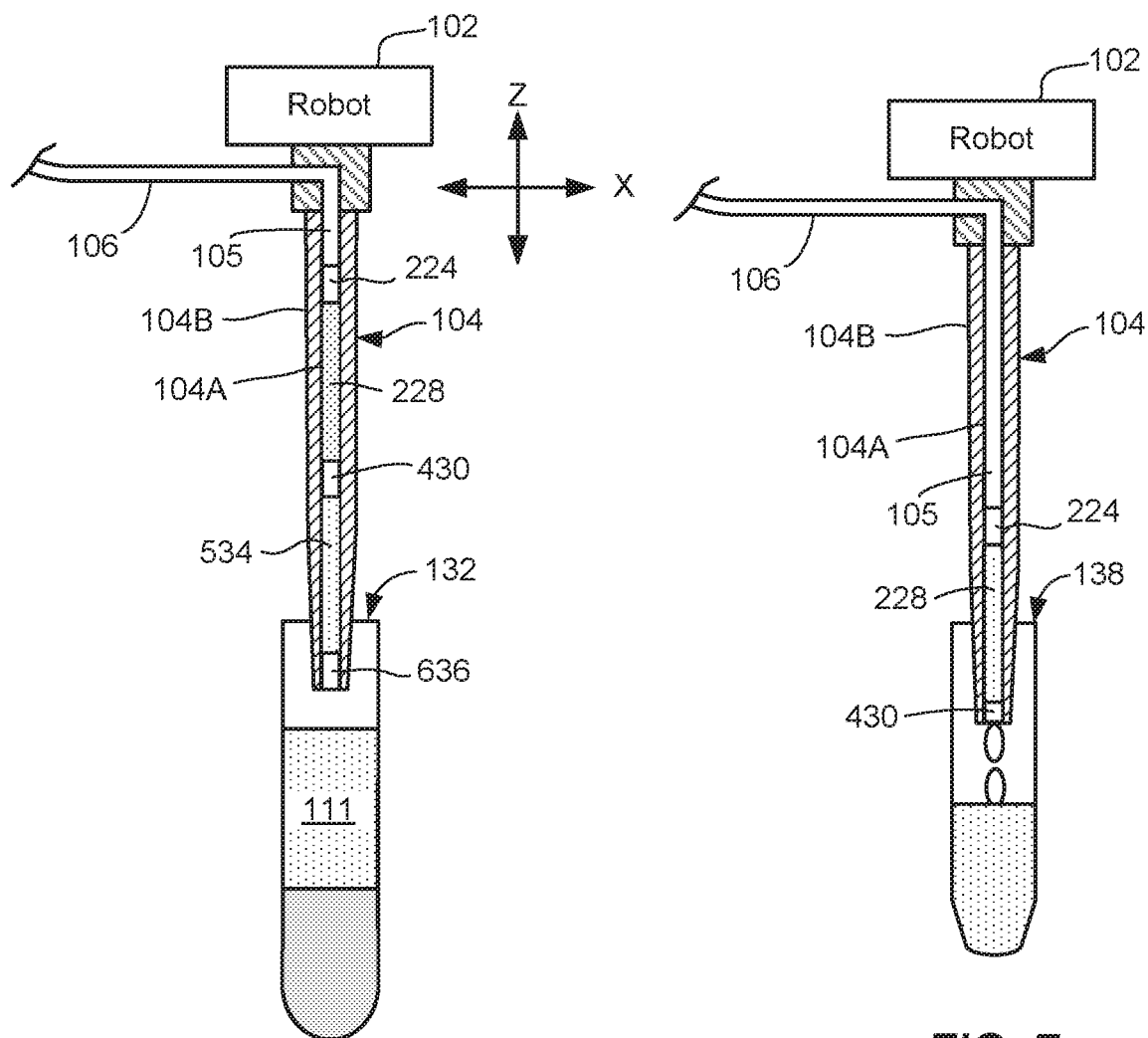
FIG. 6 illustrates a cross-sectioned side view of a pipette of the aspirating and dispensing apparatus showing aspiration of a third air separator below the specimen according to embodiments.
FIG. 7 illustrates a cross-sectioned side view of a pipette of the aspirating and dispensing apparatus showing dispensing of the specimen, but not the scavenger segment according to embodiments.

Prior to leaving the area of the specimen container 132, a third air separator 636 may be aspirated into the interior 104A of the pipette 104, as shown in FIG. 6. The pipette 104 and its contents may then be moved by robot 102 to the reaction vessel 138, may be lowered, and the specimen segment 534 may be dispensed into the reaction vessel 138 via action of the aspirator/dispenser unit 108, as well as part of the second air separator 430 (e.g., about half of the second air separator 430). However, none of the scavenger segment 228 is dispensed into the reaction vessel 138.

Figure 8:
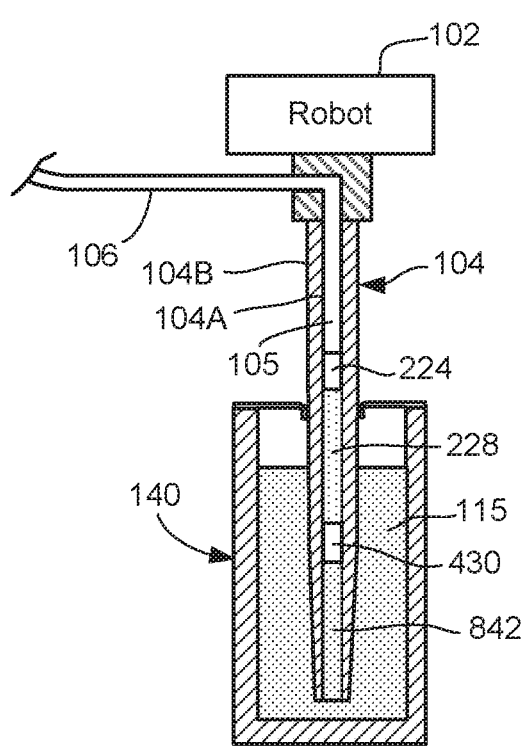
FIG. 8 illustrates a cross-sectioned side view of a pipette of the aspirating and dispensing apparatus shown immersed in, and aspirating, a cleaning solution from a cleaning solution pack according to embodiments.

As shown in FIG. 8, the pipette 104 may then be moved by robot 102 to a cleaning solution pack 140 and inserted therein. Pipette 104 may pierce the film cover of the cleaning solution pack 140, or the cover may be otherwise removed. Then a cleaning solution segment 842 may be aspirated via action of the aspirator/dispenser unit 108 from the cleaning solution pack 140. Cleaning solution pack 140 may be any suitable container containing the cleaning solution 115. Cleaning solution 115 may be a hypochlorite-containing liquid.

Figure 9:
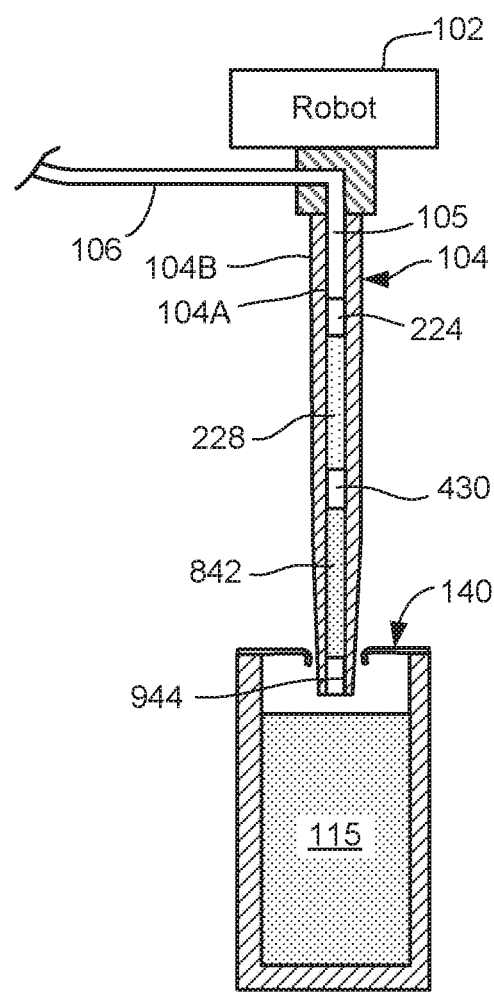
FIG. 9 illustrates a cross-sectioned side view of a pipette of the aspirating and dispensing apparatus shown aspirating a fourth air segment according to embodiments.
Figure 10:
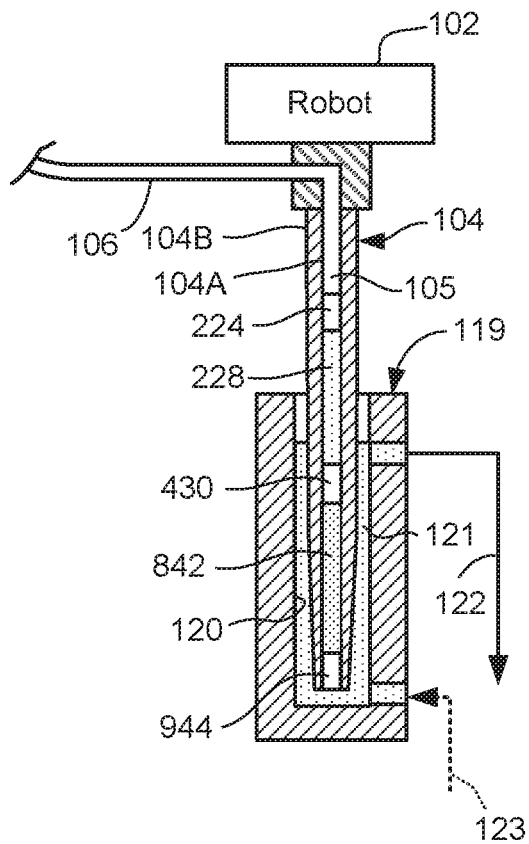
FIG. 10 illustrates a cross-sectioned side view of a pipette of the aspirating and dispensing apparatus shown immersed in a wash station according to embodiments.

Next, as shown in FIG. 9, the pipette 104 may be raised and a fourth air separator 944 may be aspirated via action of the aspirator/dispenser unit 108. Now the pipette 104 may be moved by robot 102 to the wash station 119 and immersed in the reservoir 120 to near the bottom thereof (as shown in FIG. 10). Wash station 119, as used herein, is any location that is conventionally used to discard waste material, i.e., cleaning solutions, bleach-containing liquids, and the like. The reservoir 120 may be filled to a desired level with a wash liquid 121 (e.g., water, optionally including a wash solution introduced from an inflow 123 or a combination thereof). This immerses the pipette 104 in the wash liquid 121 to a desired depth.

Figure 11:
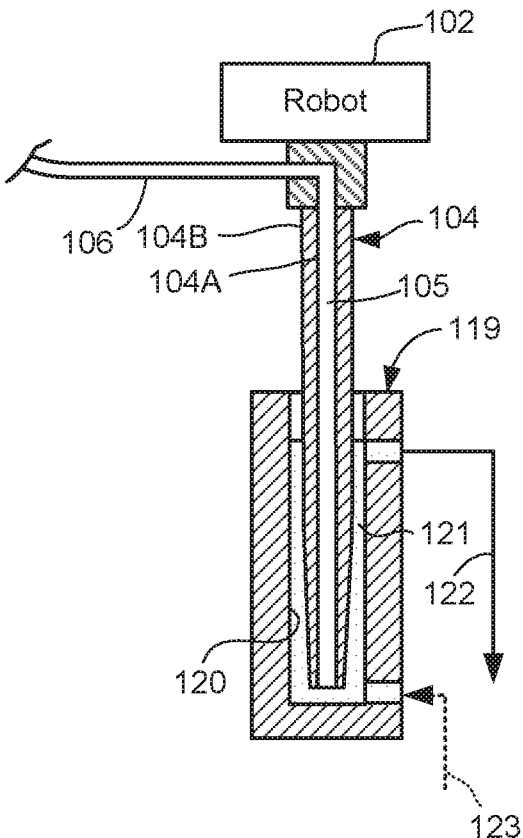
FIG. 11 illustrates a cross-sectioned side view of a pipette of the aspirating and dispensing apparatus shown immersed in a wash station after having dispensed the scavenger segment and cleaning solution segment into the wash station reservoir and having flushed the pipette with liquid backing according to embodiments.

As shown in FIG. 11, after immersion, the cleaning solution segment 842, the scavenger segment 228, and the liquid backing 105 may be dispensed from the interior 104A of the pipette 104 into the wash station 119 by the use of the high speed pump 116, for example. This pumping flushes the wash liquid 121 and the liquid backing 105 from the reservoir 120 and out through the outflow 122. Along with the dispensed wash liquid 121, cleaning solution segment 842, scavenger segment 228, and liquid backing 105, a majority of loosely-adhered proteins of the specimen 111 may be removed from the interior 104A or exterior 104B of the pipette 104.

As should be understood, including the use of a scavenger segment 228 may have equal applicability in reducing the propensity for carryover of reagent 117. In the reagent case, aspiration of reagent 117 from the reagent pack 127 may be preceded by aspiration of a scavenger segment 228. Reagent and scavenger may be separated by an air separator. Similarly, a cleaning solution may be aspirated following dispensing of the reagent 117. Thus, in the same manner as with residue of the specimen 111, residue of the reagent 117 may be more readily removed by including the reagent 117 below the scavenger segment 228. Furthermore, it should be understood that the order of the wash operation at the wash station 119 and cleansing operations with the cleaning solution 115 may be reversed in some embodiments. Furthermore, the cleansing operations with the cleaning solution 115 may not take place in some embodiments, but rather rinsing the pipette 104 with liquid backing 105 alone.

Figure 12:
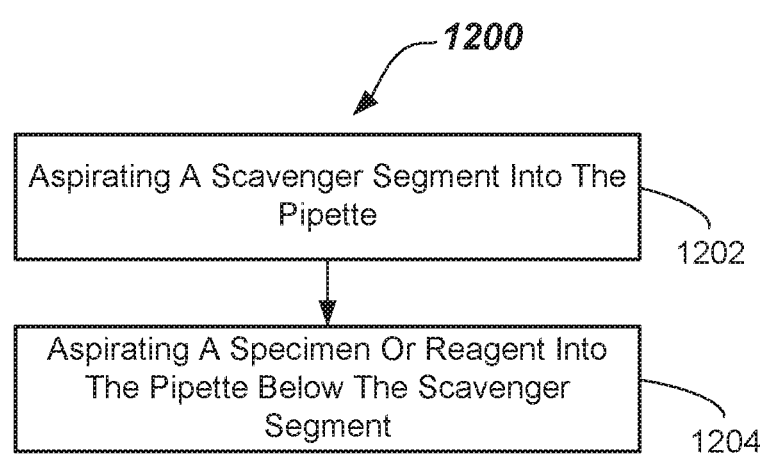
FIG. 12 illustrates a flowchart of a method of reducing carryover in a pipetting operation according to embodiments.

FIG. 12 illustrates a method of reducing carryover in a pipetting operation. The method 1200 includes, in 1202, aspirating a scavenger segment (e.g., scavenger segment 228) into the pipette (e.g., into the interior 104A of pipette 104), and, in 1204, aspirating a specimen (e.g., specimen 111 from specimen container 132) or reagent (e.g., reagent 117) into the pipette (e.g., into the interior 104A of pipette 104), below the scavenger segment (e.g., scavenger segment 228).

The method 1200 may include dispensing the specimen 111 or reagent 117 into a reaction vessel 138, but not the scavenger segment 228. Liquid backing 105 may be used as the vehicle for aspirating reagent 117. Like before, a first air segment may be aspirated between a liquid backing 105 and the scavenger segment 228. Similarly, a second air segment may be aspirated and provided between the scavenger segment 228 and the reagent 117.

Thus, it should be recognized that, at times, the pipette 104 comprises an interior 104A containing either a specimen 111 or reagent 117, and a scavenger segment 228. Pipette 104 may also contain liquid backing 105, and may include one or more air segments (e.g., first air separator 224 and/or second air separator 430).

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of reducing carryover in a pipetting operation, comprising:
   aspirating a scavenger segment into a pipette, wherein the scavenger segment comprises comprising a phosphate-buffered saline and a surfactant; and
   aspirating a specimen or reagent into the pipette below the scavenger segment.

2. The method of claim 1, wherein the scavenger segment is provided between a liquid backing in the pipette and the specimen or reagent.

3. The method of claim 1, wherein the surfactant comprises a non-ionic surfactant.

4. The method of claim 3, wherein the surfactant comprises a polysorbate surfactant.

5. The method of claim 1, wherein the scavenger segment has a volume of between about 20 µL and about 200 µL.

6. The method of claim 1, wherein the scavenger segment has a pH of between about 6.5 pH and about 8.5 pH.

7. The method of claim 1, comprising dispensing the specimen or reagent into a reaction vessel, but not the scavenger segment.

8. The method of claim 1, comprising aspirating an air segment between a liquid backing and the scavenger segment.

9. The method of claim 1, comprising aspirating an air segment between the scavenger segment and the specimen or reagent.

10. The method of claim 9, wherein the air segment between the scavenger segment and the specimen or reagent has a volume of greater than about 5 µL.

11. The method of claim 9, wherein the air segment between the scavenger segment and the specimen or reagent has a volume of between about 5 µL and about 50 µL.

12. A method of reducing carryover in an automated clinical analyzer, comprising:
    providing a pipette including a liquid backing;
    aspirating a first air segment into the pipette below the liquid backing;
    aspirating a scavenger segment into the pipette below the first air segment, wherein the scavenger segment comprises a non-ionic surfactant comprising a polysorbate surfactant;
    aspirating a second air segment into the pipette below the scavenger segment;
    aspirating a specimen or reagent into the pipette below the second air segment; and
    dispensing the specimen or reagent into a reaction vessel, but not the scavenger segment.

13. A pipette, comprising:
    a pipette interior including:
        a specimen or reagent; and
        a scavenger segment, wherein the scavenger segment comprises a phosphate-buffered saline and a surfactant.

14. The pipette of claim 13, comprising a liquid backing.

15. The pipette of claim 14, comprising a first air segment between the liquid backing and the scavenger segment, and a second air segment between the scavenger segment and the specimen or reagent.

16. The pipette of claim 13, wherein the surfactant comprises a non-ionic surfactant.

17. An aspiration and dispensing apparatus, comprising:
    a robot;
    a pipette moveable by the robot, the pipette including a liquid backing;
    a pump fluidly coupled to the liquid backing;
    a controller configured to generate control signals to move the robot and actuate the pump to effectuate:
        aspiration of a scavenger segment into the pipette below the liquid backing, wherein the scavenger segment comprises a non-ionic surfactant comprising a polysorbate surfactant;
        aspiration of a specimen into the pipette below the scavenger segment; and
        dispensing the specimen into a reaction vessel, but not the scavenger segment.

18. A method of reducing carryover in a pipetting operation, comprising:
    aspirating a scavenger segment into a Ere pipette, wherein the scavenger segment comprises a polysorbate surfactant; and
    aspirating a specimen or reagent into the pipette below the scavenger segment.

19. The method of claim 18, wherein the scavenger segment further comprises a phosphate-buffered saline.

20. The method of claim 18, wherein the scavenger segment comprises a buffer.

21. The method of claim 18, wherein the scavenger segment is provided between a liquid backing in the pipette and the specimen or reagent.

22. The method of claim 18, wherein the scavenger segment has a pH of between about 6.5 pH and about 8.5 pH.

23. The method of claim 18, comprising aspirating an air segment between a liquid backing and the scavenger segment.

24. The method of claim 18, comprising aspirating an air segment between the scavenger segment and the specimen or reagent.

\* \* \* \* \*